United States Patent [19]

Mindick

[11] 3,798,423

[45] Mar. 19, 1974

[54] DIAGNOSTIC DATA CARD CONSTRUCTION

[75] Inventor: Leo R. Mindick, Flushing, N.Y.

[73] Assignee: Medislide Industries, Inc., Great Neck, N.Y.

[22] Filed: Oct. 4, 1971

[21] Appl. No.: 185,965

[52] U.S. Cl. .............. 235/61.12 R, 211/41, 211/45, 350/95

[51] Int. Cl. ....................... G02b 21/34, G06k 19/00

[58] Field of Search ............ 235/61.12; 73/53, 64.1, 73/423 A; 125/1, 2; 356/36, 39; 211/41, 45, 71; 346/134; 40/158 R; 68/157, 197, 199; 95/95, 91, 98, 100; 134/135, 201

[56] References Cited

UNITED STATES PATENTS

| | | | |
|---|---|---|---|
| 2,770,572 | 11/1956 | Eldon | 73/53 |
| 3,129,294 | 4/1964 | Henatsch | 340/365 |
| 3,532,412 | 10/1970 | Miller | 40/158 R |
| 2,522,416 | 9/1950 | Weiskopf | 95/100 UX |
| 3,069,002 | 12/1962 | Hart | 95/100 UX |

FOREIGN PATENTS OR APPLICATIONS

| | | | |
|---|---|---|---|
| 783,368 | 4/1968 | Canada | 95/100 |

OTHER PUBLICATIONS

IBM Tech. Discl. Bulletin, Christy et al., "Record Cards with Magnetic & Visual Data," Vol. 10, No. 10, 3/1968, pp. 1,593, 1,594.

IBM Tech. Discl. Bulletin, Brackett et al., "Pathology Specimen Preparation," Vol. 12, No. 5, 10/1969, pp. 709, 710.

IBM Tech. Discl. Bulletin, Kuntzelman et al., "Automated Blood Typing," Vol. 10, No. 10, 3/1968, pp. 1,450, 1,451.

IBM Tech. Discl. Bulletin, Neufeld, "Aperture Card for Blood Typing," Vol. 11, No. 2, 7/1968, pp. 124, 125.

*Primary Examiner*—Thomas J. Sloyan
*Attorney, Agent, or Firm*—Gottlieb, Rackman & Reisman

[57] ABSTRACT

A data card adapted for use in diagnostic equipment. The card includes both an information-receiving region for presenting patient identification and test results, and a testing region which bears the specimen to be examined. The testing region comprises one or more segments which can be removed from the card for further analysis.

14 Claims, 3 Drawing Figures

PATENTED MAR 19 1974 3,798,423

DIAGNOSTIC DATA CARD CONSTRUCTION

This invention relates to diagnostic apparatus, and in particular to a combined data and testing card for identifying and performing analysis of patient specimens.

As advances continue to be made in the biological and medical sciences, increasing demands are made on associated technologies to develop comparably improved equipment and techniques. Thus, the medical world is constantly searching for and refining testing procedures to facilitate the prevention, detection and treatment of numerous diseases. In order for such testing procedures to be made available to the public, however, practical apparatus must be designed to permit the testing to be applied on a wide scale.

There are a number of medical testing procedures which have long been accepted in the medical diagnostic field, but which are not utilized as efficiently or as conveniently as they might be because of the lack of suitable support equipment. Thus, in many types of approved and highly desirable testing procedures (e.g., the "Pap test" for uterine cancer, various biopsies, etc.), the conventional slide currently in world-wide use is a rectangular glass slide, usually measuring about 3 inches × 1 inch. While such slides permit microscopic, electronic or electro-optical analysis to be conducted with respect to specimens deposited thereon, there are a number of drawbacks in their use. Perhaps the conventional slide's chief limitation is its restriction to merely being a carrier of specimens — it has little or no capacity for receiving identifying indicia to associate the test information with important criteria such as the patient's name, whether the patient is in the hospital or an out-patient, the doctor's name and the type of test. Moreover, these conventional slides do not readily lend themselves to automated handling of any kind. In particular, it is difficult and relatively expensive to batch-handle slides of the conventional variety, and this represents a failure of technology to contemplate any type of analytical function beyond mere specimen-carrying to be fulfilled by conventional slides. Moreover, current automated processing equipment magnifies significantly the problem of mis-identification of specimens.

To the extent that the prior art has addressed itself to this matter, the results are quite unsatisfactory in comparison to the scope of the problem. To assist in identifying slide specimens, the prior art has utilized generally cumbersome apparatus such as auxiliary slide covers, separate labels and the like, which are generally unreliable in that they can be easily discarded or even unintentionally removed from the slide itself. Such arrangements also fail to afford sufficient space to allow the entry of the necessary data consistent with present-day identification requirements. Finally, the prior art's efforts in this area totally ignore the possible utilization of a specimen-bearing member as an element in a data processing system, which will allow not only for automated processing, but for the element to carry test results corresponding to its own specimen.

It is therefore an object of this invention to obviate one or more of the aforesaid difficulties.

It is another object of this invention to provide a diagnostic element having both identification and test regions.

It is a further object of this invention for a diagnostic element to be capable of mass automated handling.

It is also an object of this invention that a data card used for carrying a specimen also receives thereon indications of the test results.

Additional objects and advantages of this invention will become apparent when considered in conjunction with one particular illustrative embodiment of the invention, wherein an integral data card includes both an identification area and a specimen-carrying region. The card is constructed of a suitable optical quality material, and the identification region is surface-finished so that it is capable of receiving identifying indicia, for example by writing, printing, etc. The testing region of the card is not specially finished, except for a narrow marginal edge thereof which is finished in the same manner as the identification portion of the card. The identification portion of the card may be manufactured with two basic identification areas, namely a medical identifying area relating to identifying the patient and his associated information, and a data-receiving area designed to receive test results after the diagnostic steps have been completed. Generally, the identification area will have the patient information already thereon at the commencement of the testing procedures, whereas the test results will only be printed on the identifying area at the conclusion of the testing.

The specimen-carrying region is made of optical quality plastic or other similar material (the same material of which the entire card is constructed), and can illustratively have one or more specimen-carrying segments. In a typical illustrative embodiment of the invention, two such segments are utilized. Each of the segments can receive a test specimen and considering the Pap test as one illustrative test to which the invention is applicable, the swab or spatula containing the Pap specimen is smeared onto each of the two segments. The outermost one of the segments is separated from the innermost one thereof by a transverse score line running the entire width of the testing area of the slide. Normally, the entire test area remains intact throughout the use of the card (i.e., during the testing, printout of results and storage of cards). However, the score light between the test segments affords supervisory personnel the opportunity to remove the outermost one of the segments for purposes of further analysis.

One illustrative technique of utilizing the diagnostic data card of the present invention is in an automated processing system where a plurality of cards are tested and screened as a group. The identification and test areas of the card join at a center region of the card, with the identification area being slightly wider at each border of the card than is the test region. This differential width defines a square-cornered shoulder along each side of the card and these shoulders are utilized to suspend the card in a suitable conveyor which carried the testing portion of the card through a suitable staining bath, while the identification area of the card is elevated from said bath.

In particular, the batch-handling of data cards can be achieved through the use of a card rack having a width just slightly greater than the width of the identification area of the card. Accordingly, when the card is deposited vertically downwardly into the rack, between suitable separating fins on both side walls of the rack, the card will slide smoothly downward until its two side shoulders make contact with inwardly facing ledges at the bottom of each side wall of the rack. At this point, the testing area of the slide will be projecting downward through the open bottom of the conveyor rack. Accordingly, the final rest position of each card in the rack is with its identification area held between a respective pair of adjacent but spaced fins on each side wall of the rack, its side shoulders resting by gravity action against the lower ledges of the side walls of the rack and the testing area projecting downward and out of the bottom of the rack. A plurality of slides is inserted into the rack in this manner and the loaded rack is then placed onto a suitable transport mechanism which can illustratively form a part of an automated processing system.

During automated processing, the rack can be transported along a conveyor with only the testing regions of the slide, which project down from the bottom of the rack, coming in contact with the suitable testing chemicals, such as staining baths and the like. This permits all previously entered identification information on the upper identification region of the card to remain completely intact, since it will never come in contact with the staining bath. The testing region, on the other hand, is immersed in the staining bath and the specimens previously applied to the testing region are subjected to the appropriate chemical reaction when contacted by the bath. Where the bath includes radioactive elements, the arrangement of the card of this invention also prevents radioactive contamination of the upper identification portion, which may be handled manually at some point in the process.

Following passage through the staining bath, the test regions of the card can also be separately presented to detection equipment for determination of test results. When the test results have been determined, they can be physically indicated by suitable printout indicia directly on the upper identification area of the card. If the test results indicate that some further and perhaps more stringent analysis of the specimen is needed, the outermost test segment can be separated from the card along the previously indicated scoring line, thereby creating an independent testing tool having dimensions substantially identical to those of a conventional slide, and therefore making the broken-away portion amenable to conventional manual study and analysis.

It is therefore a feature of an embodiment of this invention that a diagnostic element is comprised of an identification area capable of receiving patient and test result information on its surface, and an adjacent testing region for carrying specimens to be tested thereon.

It is another feature of an embodiment of this invention that the testing region of a diagnostic data card includes means for permitting the removal of a segment of the testing region of said card if more detailed analysis is desired.

It is also a feature of an embodiment of this invention that the identification area of the data card is slightly wider than the testing region, thereby defining side shoulders for the card to rest on a receiving ledge of a transport rack during automatic processing.

It is a further feature of an embodiment of this invention that a data card is transported through testing solutions with its testing region projecting out from a transport rack and its identification area suspended above the solution.

Additional objects, features and advantages of the present invention will become apparent when considered in conjunction with a presently preferred, but nonetheless illustrative, embodiment of the invention as explained in the following detailed description and as shown in the accompanying drawings, wherein.

Figures 1, 2, 3:
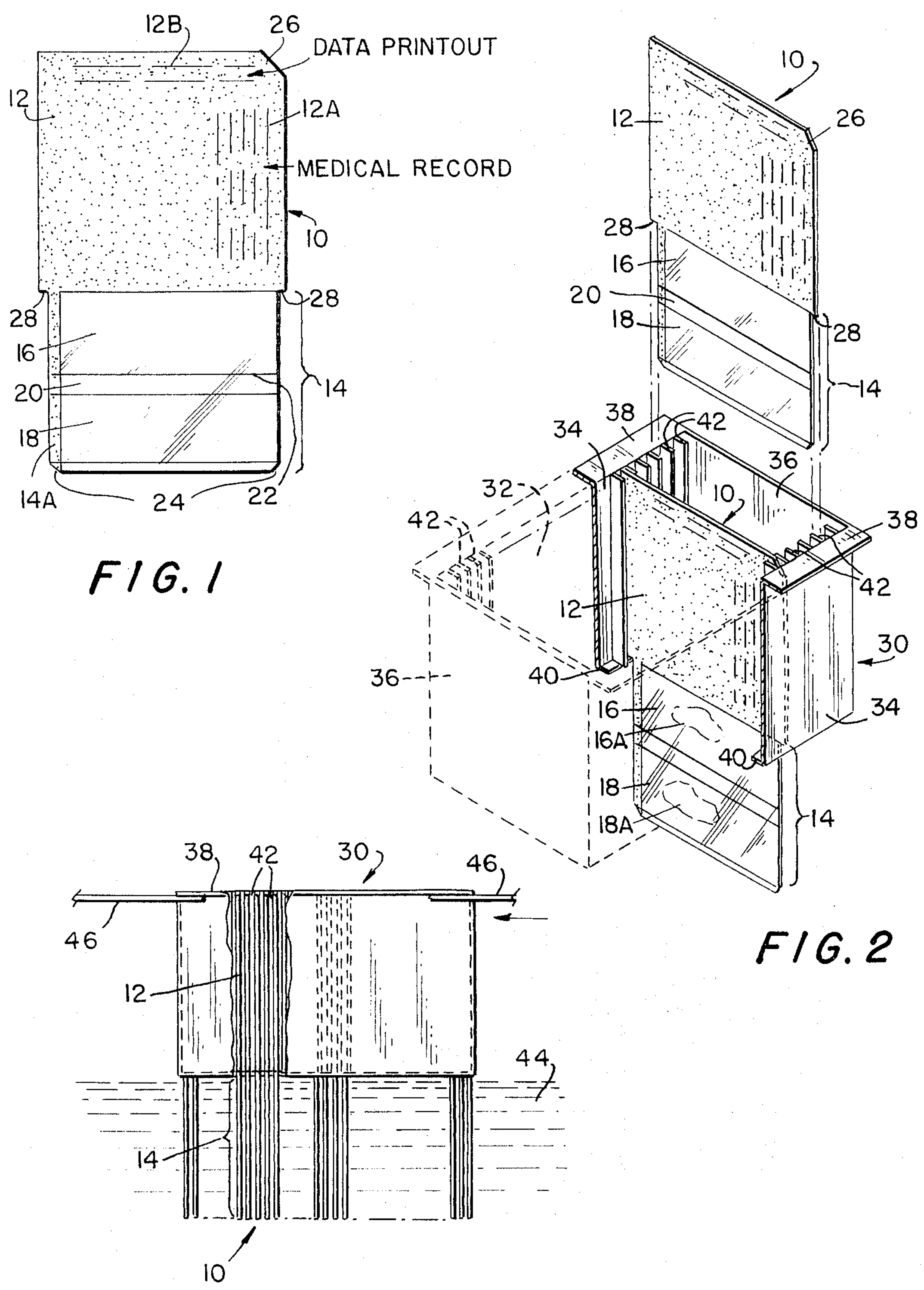
FIG. 1 is a front elevation of a diagnostic data card in accordance with the present invention, illustrating the upper identification area and the lower testing area.
FIG. 2 is a perspective view illustrating the deposit of data cards of the invention in a suitable receiving transport rack.
FIG. 3 is a side view of a transport rack carrying a plurality of data cards with the upper identification areas contained within the rack and the lower testing regions immersed in a testing bath.

Referring initially to the illustration of the invention in FIG. 1, the overall diagnostic data card 10 is shown as having an identification region 12 and a testing region 14 integral therewith. The identification region 12 includes a suitable surface finish on that portion of the card to accommodate various information thereon. For example, where the card is constructed of a suitable plastic material such as Plexiglas, a matte finish can be applied to area 12 of the card to permit written or printed information to be applied thereto. In the absence of such special finishing steps, the regular smooth plastic surface of the card would not permit permanent retention of written or printed information. When a specimen is initially to be taken, as will be described below, the identification information is applied at region 12A and may include, by way of example, the patient's name or identification number, doctor's name, hospital or out-patient location, type of test being performed, and the like. The other prearranged portion of the identification region is at 12B, but this area need only be utilized when the testing has been completed and results are indicated on the card.

The lower portion of the card 10 includes a testing and specimen-carrying region 14 which is comprised, illustratively, of two test segments 16 and 18. These segments are separated by a zone 20 which generally will act as a buffer between test specimens carried by segments 16 and 18. Suitable scoring (or other separating means such as perforations) is provided along line 22 to permit test segment 18 to be removed (i.e., broken off) from card 10 by an attendant when the automatic processing of card 10 indicates that the specimen should be more carefully examined.

Card 10 is also provided with other identification and positioning features, including beveled corners 24 on test region 14, which permit the card to be properly positioned at various stages of automatic processing, and cut-off corner 26 at the upper right-hand corner of identification area 12 of the card — this corner establishes an outline shape for card 10 which is substantially compatible with standard electronic data processing system cards, and thereby permits cards 10 to be accommodated in currently conventional data processing equipment. (It is within the scope of this invention that card 10 will be dimensioned in accordance with new types of data processing equipment yet to be developed.) Finally, it is noted that testing region 14 is slightly narrower in width than identification region 12. This width differential defines two flanges or shoulders 28 at opposite sides of card 10 to permit card 10 to rest on suitably dimensioned ledges in transport apparatus to be described hereinafter.

The views of FIGS. 2 and 3 illustrate one possible illustrative use of card 10, whereby the shape and arrangement of card 10 permits specimens in testing region 14 to be exposed to testing facilities without at the same time marring any of the identification information on region 12 of card 10. The upper portion of FIG. 2 illustrates card 10 suspended above transport rack 30. Rack 30 is substantially rectangular in top cross-section and includes an internal card-carrying chamber 32 defined by opposite side walls 34 and front and back walls 36. At the top of each of side walls 34 is an outwardly projecting lip 38 adapted to mate with suitable support mechanisms in an automatic or other processing system. The bottom of each side wall 34 includes inwardly directed ledges 40 on which corners 28 of card 10 are adapted to rest during the processing steps. Finally, side walls 34 are equipped with vertical separating fins 42 adapted to establish separate receiving chambers for each of data cards 10 between a pair of fins 42 on each side wall 34.

The introduction of data card 10 into rack 30 is suggested in FIG. 2 by the dashed lines extending downward from the card 10 which is positioned above rack 30. Thus, the card is lowered into rack 30, with testing region 14 being accommodated therein without any substantial contact with side walls 34. This downward movement of card 10 continues until corners 28 make contact with corresponding side ledges 40, as illustrated with respect to the lower one of cards 10 shown loaded into rack 30 in FIG. 2. Accordingly, this loading step results in having testing region 14 project completely out of the open bottom of rack 30, while identification area 12 is contained completely within chamber 32 of rack 30. As indicated in FIG. 2, only test specimens 16A and 18A on test segments 16 and 18 respectively, are thereby capable of being exposed to the testing solutions through which area 14 will be transported by virtue of the conveying action of rack 30.

The view of FIG. 3 illustrates rack 30 having a plurality of cards 10 loaded therein in suitable fashion for testing in accordance with this invention. Specifically, rack 30 itself is shown as having been mounted in the conveyor portion of an automatic or other processing system (not shown), and is suspended above testing bath 44 by the action of support straps 46 which rest immediately beneath side support flanges 38 of rack 30. Thus, while rack 30 is itself suspended above bath 44, the testing regions 14 of the individual cards 10 project down into bath 44 and are thereby exposed to the chemical interaction of bath 44. As indicated by the arrow at the right of FIG. 3, a conveyor mechanism serves to transport rack 30 from right to left in FIG. 3, thereby progressively moving rack 30 and its suspended cards 10 through bath 44 — this insures complete exposure of test segments 14 to the action of bath 44. A variety of test solutions and ingredients in bath 44 can be utilized, and this invention is not limited to any one such arrangement — various components of bath 44 can include color staining for subsequent optical scanning, radioactive staining for subsequent count detection, application of dyes for subsequent pattern recognition, and the like.

Where the invention is utilized for one of the typical tests to which it can be applied, namely the Pap test, the specimen is taken from the patient by means of a swab or spatula, and consists of a combination of mucous and cells of the patient. The test specimen is then smeared onto region 14 of the card, and specifically, one such smear is applied to segment 16 and another smear to segment 18. Generally prior to the application of the actual smear, suitable identifying indicia will be placed on the card in identification region 12A to permanently associate the patient with the specimen about to be applied to testing region 14 and ultimately to be analyzed and reported upon. Following the application of the smears to test region 14 and the preliminary processing (such as applying a fixative or otherwise drying the test specimen), this card, and other similarly identified and smeared cards 10, is loaded into rack 30 as illustrated in FIGS. 2 and 3. As the rack 30, with a plurality of cards 10 loaded therein, proceeds through bath 44, the appropriate testing solutions interact with smears 16A and 18A. Thereafter, each of cards 10 is withdrawn from rack 30 and is presented to suitable detection equipment (not shown) which determines the medical status of the specimen — in the case of the Pap test, the status may be defined as "positive" (indicating probable malignancy), "negative" (indicating no malignancy) and "suspicious" (indicating possible malignancy and requiring further analysis). For any test specimens which are identified by the system as either "positive" or "suspicious," further careful analysis and diagnosis is indicated. Accordingly, all of such cards 10 relating to such test results are processed by the automatic system and segregated to permit such independent analysis.

The specific test results are applied to identification region 12 of the card at sub-region 12B thereof. The specific readout may be in the form of code, or may be the words "positive," "negative" or "suspicious." At the same time, the processing equipment, dealing with cards 10 as data processing elements on a sequential basis, segregates those cards designated as "positive" or "suspicious," and groups them at a separate output location. An attendant, such as a technician, nurse or doctor, will then remove outermost test segment 18 from all such cards 10 by severing segment 18 at score line 22. This provides the attendant with a conventional slide member consisting of test segment 18 and adjacent buffer zone 20. More rigorous manual testing with respect to specimen 18A can then take place utilizing test segment 18 as an independent and now quasi-conventional slide. Innermost test segment 16 remains integral with card 10 and acts as a permanent record of the specimen for the particular patient identified by that card. This convenient method of record keeping is in contrast to the unwieldy and often impractical technique of maintaining records of slide specimens in paraffin blocks as is often done in large testing facilities — this prior art arrangement of course suffers from problems of temperature and instability, where the present invention has none of these drawbacks.

And even when a test segment 18 is removed from card 10 at score line 22 as indicated immediately above, the identification indicia provided as part of this invention are not entirely vitiated. Thus, it is noted that test region 14 includes along the left vertical margin thereof a section 14A which bears a matte finish identical to that of indentification region 12. It is contemplated that those portions of marginal area 14A adjacent to segments 16 and 18 will carry counterpart code numbers to main identification region 12, thus permitting an attendant to always match up test segments 16 and 18 with the identification information provided in greater detail in region 12 of the card. This may be particularly significant with respect to the removal of test segment 18 from a "positive" or "suspicious" data card where the greatest risk of loss of identification normally would exist. Through the use of this invention, however, such risk is minimized by providing the removable test segment 18 with its own identification region 14A, and by providing as backup identification the portion of marginal region 14A corresponding to test segment 16 which can be correlated with the basic information indicia directly in region 12 — thus, should the relationship between specimen 18 and the patient from whom such specimen was taken ever become uncertain, segment 18 can be discarded and the original test segment 16, which is still integral with card 12, can then be consulted for independent confirmatory tests.

Although the invention has been described with reference to a particular embodiment, it is to be understood that this embodiment is merely illustrative of the application of the principles of the invention. Numerous other modifications may be made therein and other arrangements may be devised without departing from the spirit and scope of the invention.

What is claimed is:

1. A test element for use in diagnosing specimens comprising a card having a first portion for receiving data corresponding to said specimen carried on said card and a second portion for carrying said specimen, and wherein said second portion includes at least two test segments, a first of said test segments adapted to be permanently attached to said card and a second of said test segments adapted to form a conventional slide element upon separation for said card.

2. A test element in accordance with claim 1 wherein said first test segment is adjacent to said first portion and said second test segment is adjacent to said first test segment and is defined by a separating line between said first and second test segments and by the edge of said element.

3. A test element in accordance with claim 2 wherein said separating line includes a region of reduced thickness of said element to facilitate the severing of said second test segment from said element.

4. A test element in accordance with claim 2 wherein said separating line includes at least one perforation in said element to facilitate the severing of said second test segment from said element.

5. A test element in accordance with claim 2 wherein the width of said second portion is substantially equivalent to the length of a conventional slide element, and the spacing between said separating line and said edge of said element is substantially equivalent to the width of a conventional slide element, such that the removal of said second test segment from said element creates a detached conventional slide element for independent analysis of the specimen thereon.

6. A test element in accordance with claim 1 wherein the width of said first portion exceeds the width of said second portion to define at least one support corner at the junction between said first and said second portions.

7. A test element in accordance with claim 6 including a support corner at each side of said element, forming a symmetrical construction for suspending said element in a substantially vertical orientation.

8. A test element in accordance with claim 1 wherein said first portion is formed with a surface finish to receive printed and written data thereon.

9. A test element in accordance with claim 8 wherein said first portion includes at least a first region containing data associated with the origin of said specimen and a second region containing data associated with the analysis of said specimen.

10. A test element in accordance with claim 8 wherein said element is dimensioned so as to be accommodated in conventional data processing equipment, and wherein data associated with the analysis of said specimen is imprinted on said first portion of said element by said data processing equipment.

11. A test element in accordance with claim 8 wherein said second region includes an area formed with said surface finish.

12. A diagnostic card for use in a multiple card-handling system comprising a first data portion and a second testing portion, means on said card for supporting said card with said first data portion above said testing portion, and a rack for carrying a plurality of said cards in said system comprising a central chamber for receiving said first data portion of each of said cards, said chamber including side walls having mounted thereon first means for separating each of said cards and second means adapted to be engaged by said supporting means on said cards to suspend the cards with said first data portion enclosed within said chamber and said second testing portion projecting out therebeneath.

13. A diagnostic card in accordance with claim 12 wherein said rack further includes a pair of upper support flanges and wherein said system includes a testing bath and transport means for receiving said flanges to carry said rack through said bath with only said testing portion of said cards immersed in said bath.

14. A diagnostic card in accordance with claim 13 wherein said supporting means on said card includes a pair of corners defined by a width differential between said first and second portions of said card, and wherein said first means includes a plurality of vertical fins on each of said side walls and said second means includes a pair of inwardly-facing ledges for respectively receiving said corners of said card.

* * * * *